United States Patent Office 3,185,692
Patented May 25, 1965

3,185,692
AMINOALKYL-N-BENZODIOXYL CARBAMATES
Claude I. Judd, Mequon, Wis., assignor to Colgate-Palmolive Company, a corporation of Delaware
No Drawing. Filed June 28, 1962, Ser. No. 205,849
19 Claims. (Cl. 260—268)

This invention relates to carbamates. More particularly, this invention is concerned with novel N-benzodioxyl carbamates, processes of producing such compounds, and pharmaceutical uses for these compounds.

This application is a continuation-in-part of my copending application Serial No. 84,754, filed January 25, 1961, and now abandoned.

According to the present invention there are provided novel N-[2-(1,4-benzodioxyl)]-carbamates of the formulae

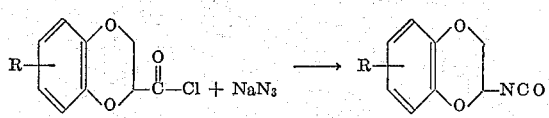

Formula 1 and

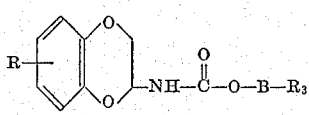

Formula 2 wherein R is hydrogen, lower alkyl such as methyl and ethyl, lower alkoxy such as methoxy and ethoxy, a halogen such as bromine and chlorine, trifluoromethyl and lower alkyl thio groups such as methylthio and ethylthio, $R_1$ and $R_2$ are members of the group consisting of hydrogen, lower alkyl groups such as methyl, ethyl, propyl, isopropyl and butyl, phenyl, phenyl-lower alkyl groups such as benzyl and phenethyl, lower alkenyl groups such as allyl, lower alkynyl groups such as propargyl, and groups in which

represents a cyclic amino group such as piperidino, morpholino, pyrrolidino, piperazino, 4 - lower alkyl piperazino such as 4 - methylpiperazino and 4 - ethyl-piperazino, 4 - (hydroxy - lower alkyl) - piperazino such as 4 - (beta-hydroxyethyl)-piperazino, 4 - (phenyl-lower alkyl)-piperazino such as 4-benzyl piperazino and 4-(alpha-methylphenethyl)-piperazino and quinuclidino, A is a lower alkylene and advisably of not more than five carbons, including the methylene, ethylene, propylene, butylene and isopropylene groups, B is a chemical bond or a lower alkylene such as represented by A, and $R_3$ is a heterocyclic group such as 3-pyridyl, 3-piperidyl, 4-piperidyl, 2 or 4-pyridyl (but only when B is an alkylene), 2-piperidyl (but only when B is an alkylene), N-lower alkyl-3 or 4-piperidyl groups such as N-methyl-3-piperidyl, N - ethyl - 4-piperidyl and N-methyl-3-piperidyl, N-acet-amido-3 or 4-piperidyl, N-(di-lower alkylamino-lower alkyl)-2, 3 or 4-piperidyl such as N-(dimethylamino-propyl)-3 or 4-piperidyl, 2-pyrrolidyl (but only when B is alkylene), 3-pyrrolidyl, N-lower alkyl-2 or 3-pyrrolidyl, N-phenyl-lower alkyl-2 or 3-pyrrolidyl, N-acetamido-3-pyrrolidyl and quinuclidinyl groups such as 3-quinuclidinyl, as well as nontoxic acid addition salts thereof.

The compounds of this invention can be produced, except those in which $R_1$ and/or $R_2$ are hydrogen and the cyclic amino groups represented by

and $R_3$ contain secondary amino groups, by reacting 1,4-benzodioxane-2-carbonyl chloride with sodium azide to produce the intermediate 1,4-benzodioxane-2-isocyanate which is then reacted with the appropriate aminoalcohol to form the N-[2-(1,4-benzodioxyl)]-carbamates. This process can be represented as follows:

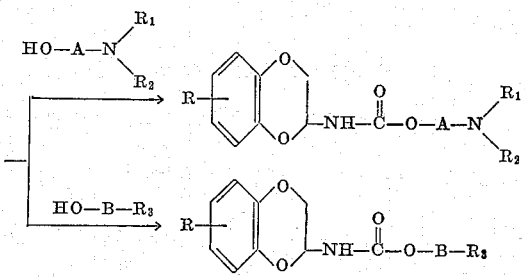

wherein R, $R_1$, $R_2$, $R_3$, A and B have the significance previously assigned but

and $R_3$ do not represent primary or secondary amines.

The first step in the process is a specific embodiment of the Curtius reaction. The reaction is effected by bringing 1,4-benzodioxane-2-carbonyl chloride and sodium azide together in toluene, heating the mixture to boiling to form an intermediate acid azide which decomposes in situ to give the desired 1,4-benzodioxyl-2-isocyanate. The reaction mixture is filtered to remove salts. The 1,4-benzodioxyl-2-isocyanate can be isolated, if desired, but this is unnecessary since it can be used in the next step as present in the filtrate.

The 1,4-benzodioxyl-2-isocyanate and an appropriate aminoalcohol are reacted by bringing them together in a suitable inert liquid reaction medium such as toluene, benzene, ether, carbon tetrachloride, xylene and chloroform. Essentially anhydrous reaction conditions are desirable. Room temperature and somewhat higher, and even lower temperatures therefrom, are suitable for the reaction. At such temperatures the reaction goes to completion in a short time, three hours ordinarily being adequate. The product can be isolated by distilling off the solvent and purified by dilution in a suitable solvent followed by precipitation as an acid addition salt.

Representative of the aminoalcohols which can be used in the process are:

N,N-dimethylaminoethanol
N,N-diethylaminopropanol
N,N-dipropylaminobutanol

N-methyl-N-benzyl aminoethanol
N,N-dibenzylaminoethanol
N-phenyl-N-carbobenzyl aminoisopropanol
N-ethyl-N-propyl aminopropanol
N,N-diallylaminopropanol
N-propargyl-N-benzyl aminoethanol
3-pyridinol
4-pyridylmethanol
Pyrrolidinopropanol
Morpholinoethanol
Piperidinoethanol
4-methylpiperazinoethanol
4-benzylpiperazinopropanol
4-(methoxyethyl)-piperazinoethanol
Quinuclidinoethanol
N-ethyl-3-piperidinol
N-methyl-4-piperidinol
N-benzyl-3-piperidinol
N-benzyl-4-piperidinol
N-methyl-3-pyrrolidinol
N-benzyl-2-hydroxymethylpiperidine
N-benzyl-3-beta-hydroxyethyl piperidine
N-ethyl-4-beta-hydroxypropyl piperidine
N-ethyl-2-beta-hydroxyethyl pyrrolidine
N-benzyl-2-gamma-hydroxypropyl pyrrolidine Typical of the products that can be produced as described are:

1-methyl-3-piperidyl-N-[2-(1,4-benzodioxyl)]-carbamate
1-benzyl-3-piperidyl-N-[2-(1,4-benzodioxyl)]carbamate
Dimethylaminoethyl-N-[2-(1,4-benzodioxyl)]carbamate
Diallylaminopropyl-N-[2-(1,4-benzodioxyl)]carbamate
Dipropargylaminoethyl-N-[2-(1,4-benzodioxyl)]-carbamate
Dibenzylaminobutyl-N-[2-(1,4-benzodioxyl)]carbamate
3-pyridyl-N-[2-(1,4-benzodioxyl)]carbamate
4-pyridylmethyl-N-[2-(1,4-benzodioxyl)]carbamate
Diphenethylaminoethyl-N-[2-(1,4-benzodioxyl)]-carbamate
1-ethyl-4-piperidyl-N-[2-(1,4-benzodioxyl)]carbamate
1-benzyl-4-piperidyl-N-[2-(1,4-benzodioxyl)]carbamate
1-methyl-3-pyrrolidyl-N-[2-(1,4-benzodioxyl)]-carbamate
1-benzyl-3-pyrrolidyl-N-[2-(1,4-benzodioxyl)]-carbamate
1-methyl-2-pyrrolidylmethyl-N-[2-(1,4-benzodioxyl)]-carbamate
1-benzyl-2-piperidylmethyl-N-[2-(1,4-benzodioxyl)]-carbamate
Morpholinoethyl-N-[2-(1,4-benzodioxyl)]carbamate
Piperidinoethyl-N-[2-(1,4-benzodioxyl)]carbamate
Pyrrolidinopropyl-N-[2-(1,4-benzodioxyl)]carbomate
1-benzylpiperazinoethyl-N-[-(1,4-benzodioxyl)]-carbamate
1-ethylpiperazinoethyl-N-[-(1,4-benzodioxyl)]-carbamate
1-quinuclidinoethyl-N-[2-(1,4-benzodioxyl)]carbamate and familiar compounds having one or more substituents on the aryl part of the benzodioxyl group, in the 5, 6, 7 or 8 positions, such as methoxy, bromine, trifluoromethyl and methylthio.

The compounds of Formulas 1 and 2 having primary or secondary amino groups, viz $R_1$ and/or $R_2$ is hydrogen and the cyclic amino groups represented by

and $R_3$ contain no N-substituent, are not prepared directly since the described reaction could lead to urea derivatives. Instead, tertiary amines within the scope of this invention are produced containing one or more accepted amine blocking substituents such as benzyl, formyl, acetyl, carbobenzoxy or Schiff's bases which are subsequently removed by conventional processes. The benzyl group is a particularly suitable blocking substituent since it can be readily cleaved by catalytic hydrogenation.

Representative of the production of a secondary amine within this invention is the catalytic hydrogenation of 1-benzyl-3-piperidyl-N-[2-1,4-benzodioxyl]carbamate to 3-piperidyl-N-[2-(1,4 - benzodioxyl)]carbamate. Similarly, 1-benzyl-3-pyrrolidyl-N-[2-(1,4 - benzodioxyl)]carbamate can be converted to 3-pyrrolidyl-N-[2-(1,4-benzodioxyl)]-carbamate; dibenzylaminoethyl-N-[2-(1,4-benzodioxyl)]carbamate can be converted to aminoethyl-N-[2-(1,4-benzodioxyl)]carbamate; and N'-ethyl-N'-benzylaminoethyl-N-[2-(1,4-benzodioxyl)]carbamate can be converted to N'-ethylamino-N-[2-(1,4-benzodioxyl)]carbamate.

The catalytic hydrogenation is readily effected by adding the compound, preferably as a salt such as the hydrochloride, to a solvent such as water or a lower alcohol. Low pressures of up to 100 p.s.i. of hydrogen are satisfactory. Palladium is a particularly useful catalyst for the hydrogenation. The hydrogenation proceeds quickly and its progress can be measured by the hydrogen uptake. When the hydrogen uptake ceases the reaction may be considered completed. After filtering the reaction mixture it can be evaporated to dryness and the product triturated with a solvent such as ether and separated by filtration.

Acid addition salts of the compounds of this invention are produced by known procedures. Some such salts that can be produced are the hydrochloride, sulfate, phosphate, citrate, maleate, fumarate and tartrate.

The compounds of this invention in animals are skeletal muscle relaxants useful in the control of skeletal muscle pain, lower back pain and muscle stiffness. They are also indicated to have analgetic properties and to be mild tranquilizers.

These compounds are advisably used for the described pharmacological purposes, as the free bases or nontoxic acid addition salts, in unit dosage pharmaceutical forms such as tablets, capsules, powders and suppositories. Such unit dosage forms are formulated to contain an effective but safe amount of the drug and generally the weight of the drug therein will be about 1.0 to 50.0% by weight of the unit dose. The unit dosage forms are advisably formulated with an inert carrier or diluent to obtain a convenient size to dosage ratio and thus facilitate handling. A typical tablet can have the composition:

| | Mg. |
|---|---|
| 1-methyl-3-piperidyl-N-[2-(1,4-benzodioxyl] carbamate | 20 |
| Starch, U.S.P. | 57 |
| Lactose, U.S.P. | 73 |
| Talc, U.S.P. | 9 |
| Stearic acid | 6 |

The following examples are presented to illustrate the invention.

EXAMPLE 1

*1-methyl-3-piperidyl-N-[2-(1,4-benzodioxyl)]-carbamate hydrochloride*

To a slurry of 42.5 g. of sodium azide in 100 cc. of toluene at 50° C. was added a solution of 20 g. (0.1 mole) of 1,4-benzodioxane-2-carbonyl chloride in 100 cc. of toluene. The mixture was slowly heated to reflux and refluxed until the evolution of nitrogen had ceased, ca. 1.5 hours. The salts were separated by filtration, an additional 42.5 g. of sodium azide was added and the mixture heated at reflux 16 hours. The salts were separated by filtration and washed with toluene.

To the toluene solution of the crude 1,4-benzodioxane-isocyanate was added 0.1 mole of N-methyl-3-hydroxypiperidine and the mixture heated at reflux for 1 hour. The solvent was removed under reduced pressure, the residue was dissolved in ether, filtered and the base extracted with dilute hydrochloric acid. The acid extracts were made basic with sodium hydroxide and the precipitated solid was collected by filtration and dried yielding 14.9 g., M.P. 131–133° C. A sample of recrystallization from ether and n-hexane had a M.P. of 142–144° C.

Analysis.—Calcd. for $C_{15}H_{20}NO_4$: N, 9.58, Found N, 9.55.

10 g. (0.034 mole) of the base was dissolved in 900 cc. of anhydrous ether and acidified with anhydrous hydrochloric acid. The solid was filtered off. Wt. 11 g. (98%), M.P. 136° C. (d.).

Analysis.—Calcd. for $C_{15}H_{21}ClN_2O_4$: N, 4.26, Cl, 10.78. Found: N, 4.13; Cl, 10.81.

EXAMPLE 2

*1-benzyl-3-piperidyl-N-[2-(1,4-benzodioxyl)]-carbamate hydrochloride*

To a slurry of 42.5 g. (0.65 mole) of sodium azide in 100 cc. of dry toluene at 50° C. was added a solution of 20 g. (0.1 mole) of 1,4-benzodioxane-2-carbonyl chloride in 100 cc. of dry toluene. After refluxing for 15 hours, the salts were separated by filtration.

To the toluene solution of 1,4-benzodioxane-2-isocyanate was added 19.2 g. (0.1 mole) of N-benzyl-3-hydroxypiperidine and the mixture heated at reflux for 1 hour. The solvent was removed by distillation under reduced pressure and the residue was dissolved in 300 cc. of anhydrous ether. Acidification with ethereal hydrochloric acid caused the salt to separate. The solid was collected by filtration and suspended in 100 cc. of acetonitrile. After filtration and drying the product weighed 19.3 g., M.P. 211–212° C.

Analysis.—Calcd. for $C_{21}H_{25}ClN_2O_4$: N, 3.46; Cl⁻, 8.76. Found: N, 3.49; Cl⁻, 9.16.

EXAMPLE 3

*3-piperidyl-N-[2-(1,4-benzodioxyl)]-carbamate hydrochloride*

A mixture of 15.4 g. (0.038 mole) of 1-benzyl-3-piperidyl-N-[2-(1,4-benzodioxyl)]carbamate hydrochloride, 3 g. of 10% palladium-on-charcoal and 200 cc. of methanol was placed in a Parr hydrogenator and shaken under hydrogen at 60 p.s.i. In 20 minutes the theoretical amount of hydrogen was consumed and the catalyst was separated by filtration. The residue remaining after removal of the solvent was recrystallized from 80 cc. of 50% acetonitrile-ether leaving 10.2 g. of salt, M.P. 170–171° C.

Analysis.—Calcd. for $C_{14}H_{19}ClN_2O_4$: N, 4.45; Cl⁻ 11.27. Found: N, 4.55; Cl⁻, 11.39.

EXAMPLE 4

*3-[4-d-(1-phenyl-2-propyl)-1-piperazinyl]-propyl-N-[2-(1,4-benzodioxyl)]carbamate di acid fumarate*

To a solution consisting of 17.7 g. (0.1 mole) of 2-(1,4-benzodioxyl)isocyanate and 250 cc. of dry toluene was added 26.2 g. (0.1 mole) of d-N-(1-phenyl-2-propyl)-N'-(gamma-hydroxy propyl) piperazine dissolved in 50 cc. of dry toluene. The solution was refluxed for two hours, filtered and concentrated to dryness under vacuum, residue (46.8 g.).

The above base (8 g.), 4.2 g. of fumaric acid and 200 cc. of ethanol were heated until solution occurred. The solid was filtered off. Wt. 8.5 g. (69.5%), M.P. 188–190° C. (d.).

Analysis.—Calcd. for $C_{33}H_{41}N_3O_{12}$: C, 59.03; H, 6.15; N, 6.26; N.E., 167.92. Found: C, 58.86; H, 6.38; N, 6.09; N.E., 145.60.

EXAMPLE 5

*1-ethyl-2-pyrrolidylmethyl N-[2-(1,4-benzodioxyl)]-carbamate acid fumarate*

To a solution consisting of 17.7 g. (0.1 mole) 2-(1,4-benzodioxyl) isocyanate and 250 cc. of dry toluene was added 12.9 g. (0.1 mole) of N-ethyl-2-pyrrolidyl methanol dissolved in 30 cc. of dry toluene. The solution was refluxed for two hours, filtered, and concentrated to dryness under vacuum, residue (24.3 g.).

The residue (24.3 g.), 10.1 g. of fumaric acid and 250 cc. of isopropanol were heated until solution occurred. The solid was collected by filtration. Wt. 16 g. (38%), M.P. 167–168° C. (d.).

Analysis.—Calcd. for $C_{20}H_{26}N_2O_8$: C, 56.86; H, 6.21; N, 6.63; N.E., 211.21. Found: C, 57.10; H, 6.23; N, 6.55; N.E., 198.42.

EXAMPLE 6

*4-pyridyl-gamma-pyropyl-N-[2-(1,4-benzodioxyl)]-carbamate acid fumarate*

To a solution consisting if 17.7 g. (0.1 mole) of 2-(1,4-benzodioxyl)isocyanate and 250 cc. of dry toluene was added 13.7 g. (0.1 mole) of 4-pyridyl propanol dissolved in 50 cc. of dry toluene. The solution was refluxed for two hours, filtered and concentrated to dryness under vacuum, residue 29.5 g.

The residue (29.5 g.), 10.9 g. of fumaric acid and 200 cc. of ethanol were heated until solution occurred. The solid was filtered off. Wt. 17.8 g., M.P. 139–140° C. The solid was recrystallized in 200 cc. of acetonitrile. Wt. 11.5 g., M.P 139–140° C.

Analysis.—Calcd. for $C_{38}H_{40}N_4O_{12}$: C, 61.28; H, 5.41; N, 7.52; N.E., 372.3. Found: C, 60.83; H, 5.56; N, 7.66; N.E. 349.7.

EXAMPLE 7

*3-(methyl-1-piperazinyl)-propyl-N-[2-(1,4-benzodioxyl)]-carbamate di acid fumarate*

To a solution consisting of 17.7 g. (0.1 mole) of 2-(1,4-benzodioxyl) isocyanate and 250 cc. of dry toluene was added 15.8 g. (0.1 mole) of 4-methyl-1-(3-hydroxy propyl) piperazine. The solution was refluxed for two hours, filtered and concentrated to dryness under vacuum, residue 28.0 g.

The above base 28 g., 10.4 g. of fumaric acid and 250 cc. of ethanol were heated until solution occurred. The solid was filtered off. Wt. 21 g., M.P. 178–182° C. The solid was recrystallized in 1220 cc. of ethanol. Wt. 12.6 g., 191–193° C.

Analysis.—Calcd. for $C_{25}H_{33}N_3O_{12}$: C, 52.91; H, 5.86; N, 7.40; N.E., 141.88. Found: C, 52.93; H, 5.53; N, 7.34; N.E., 137.50.

EXAMPLE 8

*3-quinuclidyl-N-[2-(1,4-benzodioxyl)]-carbamate acid fumarate*

To a solution consisting of 177 g. (0.1 mole) of 2-(1,4-benzodioxyl)isocyanate and 250 cc. of dry toluene was added 12.7 g. (0.1 mole) of quinuclidinol dissolved in 150 cc. of dry toluene. The solution was refluxed for two hours, filtered and concentrated to dryness under vacuum, residue 35.1 g.

The above base 10.0 g., 3.8 g. of fumaric acid and 400 cc. of isopropanol where heated until solution occurred. The solid was filtered off. Wt. 4.2 g., M.P. 176–177° C. (d.).

Analysis.—Calcd. for $C_{20}H_{24}N_2O_8$: C, 57.13; H, 5.76; N, 6.66; N.E., 210.2. Found: C, 57.31; H, 5.69; N, 6.82; N.E., 209.5.

EXAMPLE 9

*1,1-diethylamino-3-propyl-N-[2-(1,4-benzodioxyl)]-carbamate hydrochloride*

To a solution consisting of 17.7 g. (0.1 mole) of 2-(1,4-benzodioxyl)isocyanate and 250 cc. of dry toluene was added 13.1 g. (0.1 mole) of diethylaminopropanol. The solution was refluxed for two hours, filtered and concentrated to dryness under vacuum, residue 27.5 g.

The above base was dissolved in ether and acidified with ethereal hydrochloric acid. The solid was filtered off. Wt. 16.5 g. (56%), M.P. 136–137° C.

*Analysis.*—Calcd. for $C_{16}H_{25}Cl\ N_2O_4$: C, 55.73; H, 7.31; N, 4.06; Cl. 10.28. Found: C, 55.57, H, 7.42; N, 4.06; Cl. 10.15.

Various changes and modifications of the invention can be made and, to the extent that such variations incorporate the spirit of this invention, they are intended to be included within the scope of the appended claims.

What is claimed is:

1. A member of the group consisting of compounds of the formula

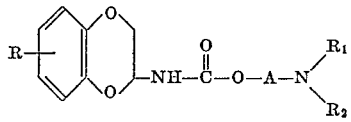

and

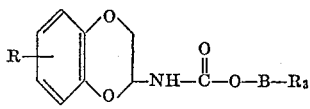

wherein R is at least one member of the group consisting of hydrogen, lower alkyl, lower alkoxy, halo, trifluoromethyl and lower alkyl thio groups, $R_1$ and $R_2$ are members of the group consisting of hydrogen, lower alkyl, phenyl, phenyl-lower alkyl, lower alkenyl, lower alkynyl and groups in which

represents a cyclic amino of the group consisting of piperidino, morpholino, pyrrolidino, piperazino, quinuclidino, 4-lower alkyl piperazino, 4-(hydroxy-lower alkyl)-piperazino and 4-(phenyl-lower alkyl)-piperazino, $R_3$ is a member of the group consisting of pyridyl, piperidyl, pyrrolidyl, N-lower alkyl piperidyl, N-(phenyl-lower alkyl)-piperidyl, N-di-lower alkyl amino-lower alkyl piperidyl, N-lower alkyl pyrrolidyl, N-(phenyl-lower alkyl)-pyrrolidyl, N-acetamido-pyrrolidyl, N-acetamido-piperidyl, quinuclidinyl and N-di-lower alkyl amino-lower alkyl pyrrolidyl, A is a lower alkylene and B is a member of the group consisting of a chemical bond and lower alkylene groups, but B is not a bond when the quinuclidinyl, piperidyl and pyrrolidyl groups are bonded in the 2-positions of these rings and the pyridyl group is bonded in the 2 and 4 positions of this ring, and nontoxic acid addition salts thereof.

2. 3 - [4 - d - (1 - phenyl - 2 - propyl) - 1 - piperazinyl]-propyl-N-[2-(1,4-benzodioxyl)]-carbamate.

3. 1 - ethyl - 2 - pyrrolidylmethyl N - [2 - (1,4 - benzodioxyl)]-carbamate.

4. 1 - lower alkyl - 3 - piperidyl - N - [2 - (1,4 - benzodioxyl)]-carbamate.

5. 1 - lower alkyl - 4 - piperidyl - N - [2 - (1,4 - benzodioxyl)]-carbamate.

6. 1 - (phenyl - lower alkyl) - 3 - piperidyl - N - [2 -(1,4-benzodioxyl)]-carbamate.

7. 1 - (phenyl - lower alkyl) - 4 - piperidyl - N - [2 - (1,4-benzodioxyl)]-carbamate.

8. 1 - methyl - 3 - piperidyl - N - [2 - (1,4 - benzodioxyl)]-carbamate.

9. 1 - benzyl - 3 - piperidyl - N - [2 - (1,4 - benzodioxyl)]-carbamate.

10. 3-piperidyl-N-[2-(1,4-benzodioxyl)]-carbamate.

11. 1,4-benzodioxane-2-isocyanate.

12. [4 - (phenyl - lower alkyl) - 1 - piperazinyl] - lower alkyl-N-[2-(1,4-benzodioxyl)]-carbamate.

13. 1 - lower alkyl - pyrrolidyl - lower alkyl - N - [2-(1,4-benzodioxyl)]-carbamate.

14. Pyridyl - lower alkyl - N - [2 - (1,4 - benzodioxyl)]-carbamate.

15. 4 - pyridyl - gamma - propyl - N - [2 - (1,4-benzodioxyl)]-carbamate.

16. (4 - lower alkyl - 1 - piperazinyl) - lower alkyl - N-[2-(1,4-benzodioxyl)]-carbamate.

17. 3 - quinuclidyl - N - [2 - (1,4 - benzodioxyl)]-carbamate.

18. Di - lower alkyl - amino - lower alkyl - N - [2- (1,4-benzodioxyl)]-carbamate.

19. 1,1 - diethylamino-3-propyl-N-[2 - (1,4 - benzodioxyl)]-carbamate.

References Cited by the Examiner

Koo et al.: Journal American Chemical Society, vol. 77, pp. 5373–5375 (1955).

Cram et al.: Organic Chemistry, pages 460, 275, McGraw-Hill Book Co., Inc. (1959).

IRVING MARCUS, *Primary Examiner.*

WALTER A. MODANCE, *Examiner.*

UNITED STATES PATENT OFFICE
CERTIFICATE OF CORRECTION

Patent No. 3,185,692                                                May 25, 1965

Claude I. Judd

It is hereby certified that error appears in the above numbered patent requiring correction and that the said Letters Patent should read as corrected below.

Column 3, line 53, for "carbomate" read -- carbamate --; lines 55 and 57, for "-[-(1,4-", each occurrence, read -- -[2-(1,4- --; line 60, for "familiar" read -- similar --; column 4, line 7, for "-[2-1,4-benzodioxyl]" read -- -[2-(1,4-benzodioxyl)] --; line 49, for "(1,4-benzodioxyl]" read -- (1,4-benzodioxyl)] --; line 62, for "axide" read -- azide --; column 5, line 75, after "(0.1 mole)" insert -- of --; column 6, line 15, for "-pyropyl-", in italics, read -- -propyl- --, in italics; line 33, for "3-(methyl-", in italics, read -- 3-(4-methyl- --, in italics; same column 6, line 53, for "177" read -- 17.7 --; column 7, lines 4 and 5, for "Cl.", each occurrence, read -- Cl, --.

Signed and sealed this 12th day of October 1965.

(SEAL)
Attest:

ERNEST W. SWIDER                                        EDWARD J. BRENNER
Attesting Officer                                      Commissioner of Patents